United States Patent [19]

Matsui et al.

[11] Patent Number: 4,673,816

[45] Date of Patent: Jun. 16, 1987

[54] METHOD FOR INSPECTING A PATTERN AND AN APPARATUS FOR INSPECTING A PATTERN

[75] Inventors: Showgo Matsui, Sagamihara; Kenichi Kobayashi, Tokyo, both of Japan

[73] Assignee: Fujitsu Limited, Kawasaki, Japan

[21] Appl. No.: 686,896

[22] Filed: Dec. 27, 1984

[30] Foreign Application Priority Data

Dec. 27, 1983 [JP] Japan ................................. 58-249318

[51] Int. Cl.$^4$ ....................... G06K 9/64; G06F 15/336
[52] U.S. Cl. ..................................... 250/556; 250/563
[58] Field of Search ............... 250/556, 557, 562, 563;
356/71; 382/33, 34, 67

[56] References Cited

U.S. PATENT DOCUMENTS 4,435,834  3/1984  Pauli et al. ...................... 250/556 X Primary Examiner—Eugene R. LaRoche
Assistant Examiner—Steven J. Mottola
Attorney, Agent, or Firm—Staas & Halsey

[57] ABSTRACT

A method and an apparatus for inspecting a high density pattern in which a signal obtained by scanning a mask substrate having a high density pattern including repeated pattern portions is collated and compared with the signal obtained from original data used to generate the pattern. Repeated pattern data corresponding to the signal obtained by scanning said mask substrate and the repeated basic pattern data corresponding to the basic pattern of the repeated pattern portion are repeatedly collated and compared when inspecting repeated pattern portions and the repeated pattern data and the original pattern data obtained by sequentially converting the original data in synchronization with the scanning are collated and compared when inspecting the high density pattern of an area other than the repeated pattern portions.

2 Claims, 8 Drawing Figures

FIG. 7.
(D2,D4,D5)

| Y\X | 1 | 2 | 3 | 4 | 5 | 6 | 7 | 8 | 9 | 10 | 11 | 12 | 13 |
|---|---|---|---|---|---|---|---|---|---|---|---|---|---|
| 16 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 |
| 14 | 0 | 0 | 0 | 0 | 0 | 0.5 | 0.5 | 0.5 | 0 | 0 | 0 | 0 | 0 |
| 13 | 0 | 0 | 0 | 0 | 0 | 0.5 | 1 | 0.5 | 0 | 0 | 0 | 0 | 0 |
| 12 | 0 | 0 | 0 | 0 | 0 | 0.5 | 1 | 0.5 | 0 | 0 | 0 | 0 | 0 |
| 11 | 0 | 0 | 0.5 | 0.5 | 0.5 | 0.5 | 1 | 0.5 | 0.5 | 0.5 | 0.5 | 0 | 0 |
| 10 | 0 | 0 | 0.5 | 1 | 1 | 1 | 1 | 1 | 1 | 1 | 0.5 | 0 | 0 |
| 9 | 0 | 0 | 0.5 | 0.5 | 0.5 | 0.5 | 1 | 0.5 | 0.5 | 0.5 | 0.5 | 0 | 0 |
| 8 | 0 | 0 | 0 | 0 | 0 | 0.5 | 1 | 0.5 | 0 | 0 | 0 | 0 | 0 |
| 7 | 0 | 0 | 0 | 0 | 0 | 0.5 | 1 | 0.5 | 0 | 0 | 0 | 0 | 0 |
| 6 | 0 | 0 | 0 | 0 | 0 | 0.5 | 1 | 0.5 | 0 | 0 | 0 | 0 | 0 |
| 5 | 0 | 0 | 0.5 | 0.5 | 0.5 | 0.5 | 1 | 0.5 | 0.5 | 0.5 | 0.5 | 0 | 0 |
| 4 | 0 | 0 | 0.5 | 1 | 1 | 1 | 1 | 1 | 1 | 1 | 0.5 | 0 | 0 |
| 3 | 0 | 0 | 0.5 | 0.5 | 0.5 | 0.5 | 0.5 | 0.5 | 0.5 | 0.5 | 0.5 | 0 | 0 |
| 2 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 |

METHOD FOR INSPECTING A PATTERN AND AN APPARATUS FOR INSPECTING A PATTERN

BACKGROUND OF THE INVENTION

The present invention relates to a method and an apparatus for inspecting patterns which are capable of inspecting a high density pattern having repeated pattern portions, such as a reticle or a mask used for very large scale integration (VLSI) memories, etc., at a high speed.

Patterns for recent VLSIs, particularly patterns for 256K-bit or 1M-bit memories, are almost entirely oriented to high integration density and large capacity. For example, from the point of view of the level of original data used for a pattern generator, as many as $10^7$ pattern portions or pattern elements are included on a single chip, with an integration density of 5000 patterns portions/mm$^2$, or more. The inspection of either a high density pattern of a reticle, formed by a pattern generator on the basis of original data, or the high density of pattern portions on a mask substrate, is often carried by comparing and collating a signal obtained by scanning a mask substrate and a signal of the same level obtained from the original data stored on a magnetic tape. The large volume of original data required for a VLSI, however, creates problems in storing and converting the data.

In the case of a VLSI, it is difficult to convert the original data stored on a magnetic tape to original pattern data in accordance with the scanning of a mask substrate in order to perform an inspection, since an increase of the pattern density makes the original data more complicated and a longer time is required to convert original data corresponding to a constant scanning range to original pattern data than to scan the mask substrate. As a result, the scanning speed of mask substrate must be lowered and the inspection time is increased.

SUMMARY OF THE INVENTION

It is an object of the present invention to provide a method and an apparatus for inspecting a pattern which assure shorter inspection time.

It is another object of the present invention to curtail the time for inspecting a pattern of a mask substrate and to simplify an apparatus for inspecting a pattern; in particular, patterns for a typical VLSI having a high density pattern with repeated pattern portions.

The method of the present invention for inspecting a pattern relates to inspecting a mask substrate having a high density pattern including repeated pattern portions and includes the steps of (a) repeatedly comparing and collating inspected pattern data—corresponding to a signal obtained by scanning the mask substrate—and repeated basic pattern data—corresponding to the basic pattern of said repeated pattern portions—on the occasion of inspecting repeated pattern portions, and (b) repeatedly comparing and collating inspected pattern data and original pattern data, obtained by sequentially converting original data in synchronization with said mask substrate scanning, on the occasion of inspecting the high density pattern of an area other than the repeated pattern portion.

An apparatus of the present invention, for inspecting patterns on a mask substrate having a high density pattern of repeated pattern portions formed on the basis of original pattern data, comprises scanning means for scanning the mask substrate to generate an optical signal, photo-electrically converting the optical signal to an electrical inspected pattern signal and outputting the inspected pattern signal, A/D conversion means for converting said inspected pattern signal from analog to digital and outputting inspected pattern data, original data conversion means for sequentially converting the original data of said pattern in synchronization with said scanning of the maks substrate and outputting the original pattern data, original pattern memory means for temporarily storing said original pattern data, input means for inputting the repeated basic bit pattern data corresponding to the basic pattern of said repeated pattern portions to said original pattern memory means, and comparison/collation means for receiving said repeated basic pattern data from said input means, via said original pattern memory means, when said scanning means scans repeated pattern portions and repeatedly comparing and collating said repeated basic bit pattern data with inspected pattern data, and for receiving said original pattern data from said original data conversion means, via said original pattern memory means, when said scanning means scans regions other than said repeated pattern portions and sequentially comparing and collating said original pattern data with the inspected pattern data.

An embodiment of the invention will now be described by way of example and with reference to the accompanying drawings, in which:

FIG. 7 is an illustration of a data format indicating inspected pattern data, original pattern data and repeated basic pattern data.

DESCRIPTION OF THE PREFERRED EMBODIMENTS

Figure 1:
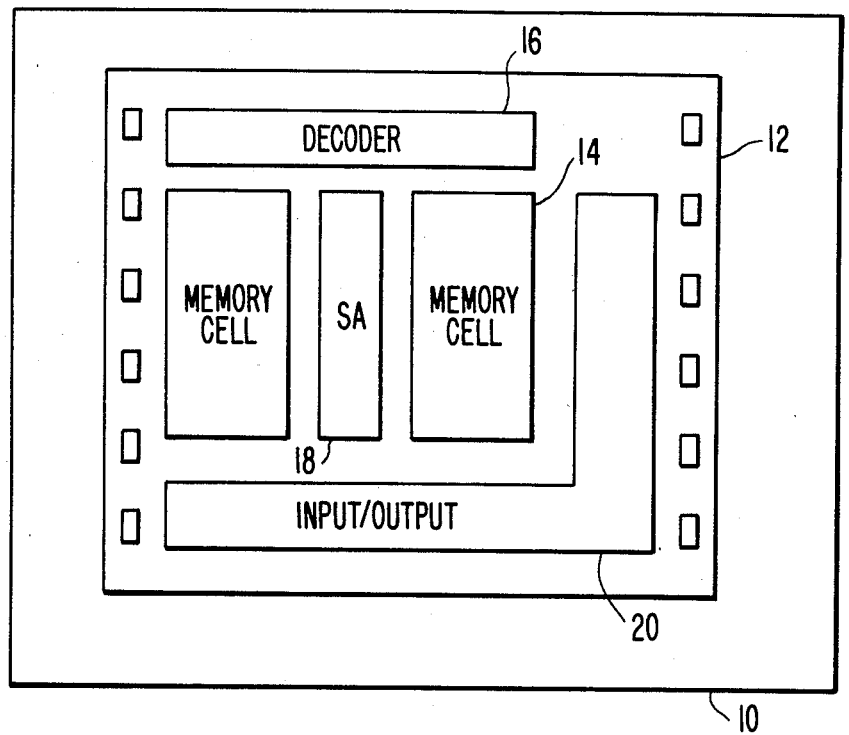
FIG. 1 is a plan view of a mask substrate.

FIG. 1 is a plan view of a mask substrate 10 which is an inspected object in the present invention. This mask substrate 10 is used for a VLSI memory. A pattern corresponding to a memory cell region 14, a decoder 16, a sense amplifier 18, an input-output portion 20, etc. are contained in a pattern 12 corresponding to a chip. Within the memory cell region 14, the basic pattern of a 1-bit memory cell is repeatedly formed.

Figure 2:
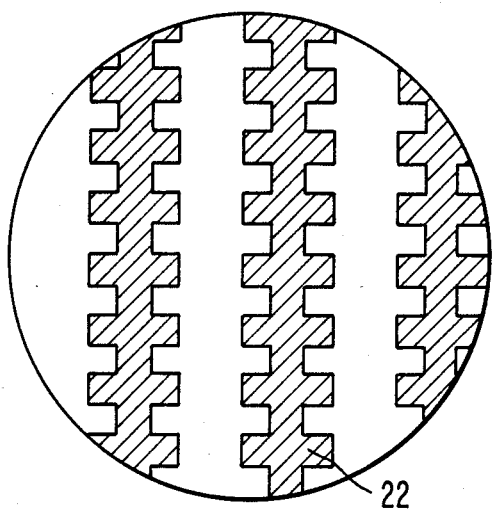
FIG. 2 is an enlarged plan view of repeated pattern portions of the mask substrate.

FIG. 2 is an enlarged plan view of the cell pattern in said memory cell reigon 14 having a mask pattern 22 which is a repeated pattern as shown in FIG. 2.

Figure 3:
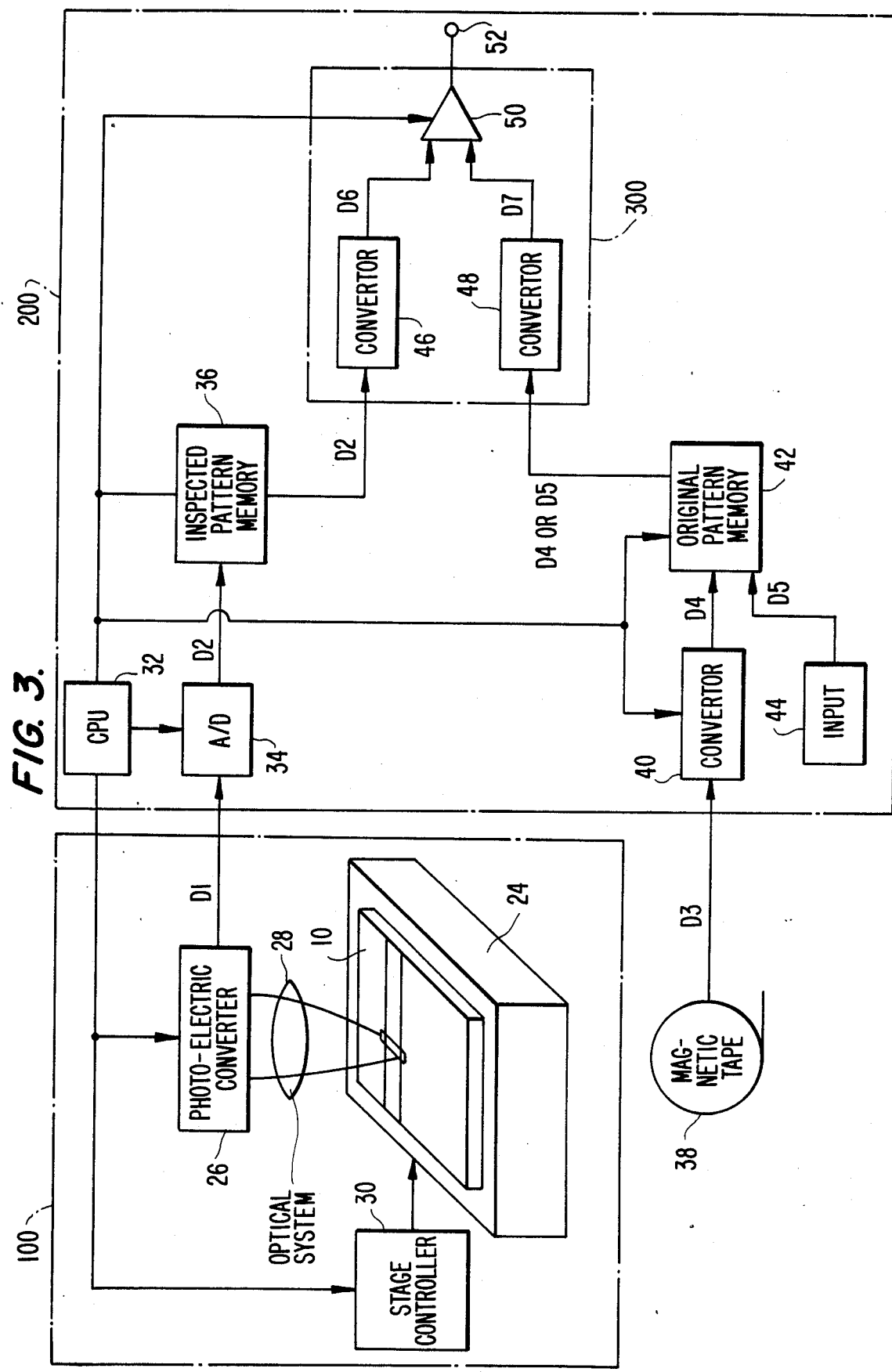
FIG. 3 is a block diagram of a pattern inspection apparatus according to an embodiment of the invention.

FIG. 3 is a block diagram of an inspection apparatus of this embodiment. As a whole, the apparatus comprises a scanning unit 100, a main unit 200 and a comparing unit 300 within said main unit 200.

The scanning unit 100 includes a stage 24 where a recticle or a mask substrate 10 is placed, a photo-electric convertor 26 which converts an optical signal sent from the pattern in the mask substrate 10 into an electrical signal, an optical system 28 including an image sensor, and a stage controller 30 which moves the stage 24 in the X and Y directions. The photoelectric converting part 26 and stage controller 30 are controlled by a synchronous signal and a control signal, etc. sent from a CPU 32.

Figure 4:
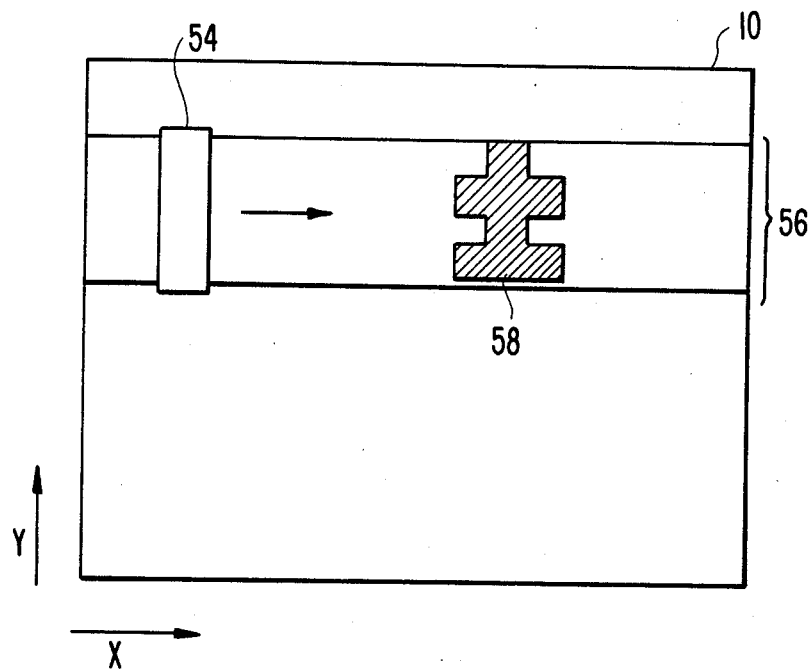
FIG. 4 is a plan view illustrating the scanning of the mask substrate.

FIG. 4 is a plan view indicating how the mask substrate 10 is scanned. The mask substrate 10 is placed on the stage 24 and is moved in the X and Y directions. Area 54 is the scanning region, having a width 56 in the Y direction, scanned by the image sensor, and for example, a region as large as 1024 bits can be scanned by the image sensor at one time. When the stage 24 moves in the X direction, a region of width 56 in the mask substrate 10 is scanned by the scanning region 54. The entire mask substrate 10 is scanned through the movement of the mask substrate 24 in the X and Y directions.

Figure 6:
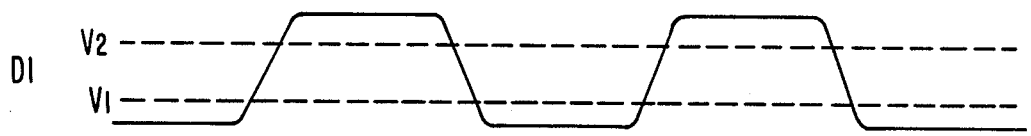
FIG. 6 is an illustration of inspected pattern signals.
Figure 5:
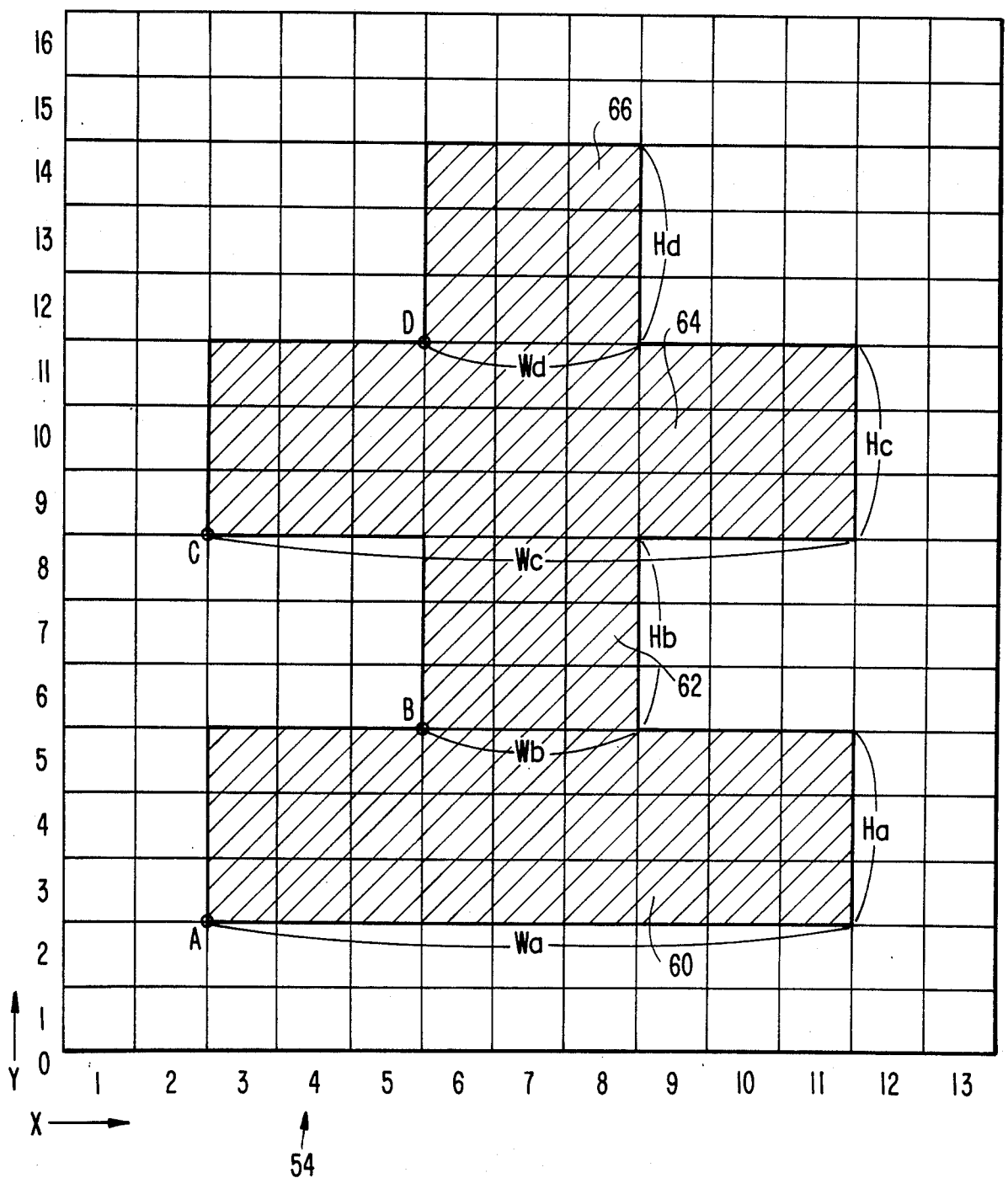
FIG. 5 is a plan view illustrating a basic pattern.

For a more detailed description, it is helpful to consider the situation where the scanning region 54 to be scanned by the image sensor is the pattern 58. FIG. 5 is an enlarged view of basic pattern and it is used here for explaining the pattern 58. Moreover, it is assumed that the scanning region 54 to be scanned by the image sensor is the longitudinal area $X=4$, in FIG. 5, and that the region 54 has an area of 16 bits in the Y direction, for simplification. In this case, the image sensor senses that the regions $Y=1, 2, 6, 7, 8, 12$ and 16 are white patterns, while the regions $Y=3-5$ and 9-11 are black patterns. The optical signals are output as an analog electrical signal, which is an inspected pattern signal $D_1$, shown in FIG. 6. The two high level regions of the voltage curve indicate the black patterns of the 3rd-5th and 9th-11th bits in the Y direction.

The inspected pattern signal $D_1$ thus obtained is converted into a digital signal, bit by bit, by the A/D conversion means 34, to generate inspected pattern data $D_2$, shown in FIG. 7. In this conversion, the signal level is sorted to a white level "0", a grey level "0.5" and a black level "1" in accordance with the signal level being high or lower than the voltage levels $V_1$ and $V_2$ shown in FIG. 6. Namely, a signal lower than the level $V_1$ is defined as the white level, a signal between the levels $V_1$ and $V_2$ as the grey level and a signal higher than the level $V_2$ as the black level. When the inspected pattern data $D_2$, relating to the pattern in the region of $13 \times 16$ bits shown in FIG. 5, is extracted, the patterns indicated in FIG. 7 can be obtained. In particular, the boundary between the white and black areas of the pattern in assigned the grey level "0.5", the black areas of the pattern are assigned the black level "1", and the white areas of the pattern are assigned the white level "0".

Such inspected pattern data $D_2$ is sequentially output in accordance with the scanning of the mask substrate and is stored in the inspected bit pattern memory means 36. The inspected pattern data $D_2$ shown in FIG. 7 indicates the data within the region of 13 bits in the X direction.

In FIG. 3, numeral 38 represents a magnetic tape for storing original data $D_3$ which is the same as that used by a pattern generator to form a pattern on the mask substrate 10; however, this storing medium may be any type desired. Since this original data $D_3$ employs a data base suited to the actual formation of patterns, it is quite different from the inspected pattern signal $D_1$ obtained by the image sensor and the inspected pattern data $D_2$ obtained by directly digitalizing the inspected pattern signal $D_1$.

For example, in the original data $D_3$, the pattern indicated by the hatched area in FIG. 5 is divided into four rectangular areas 60, 62, 64 and 66. Regarding the shape of area 60, the coordinates (3,3) of the point A and width $W_a$ and height $H_a$ of the shape of area 60 are stored as original data. In the same way, original data regarding the shape of area 62, 64 and 66, including the coordinates (6,6) of point B, width $W_b$, and height $H_b$, the coordinates (3,9) of point C, width $W_c$, and height $H_c$, and the coordinates (6,12) of point D, width $W_d$, and height $H_d$, are stored. Thus, the original data $D_3$ for the pattern portion shown in FIG. 5 is indicated as ((3,3), $W_a$, $H_a$, (6,6), $W_b$, $H_b$, (3,9), $W_c$, $H_c$, (6,12), $W_d$, $H_d$).

The original data $D_3$ is suited only to pattern formation and, since it is not based on bit units, as is the inspected pattern data $D_2$, such original data is not suitable for pattern inspection. Accordingly, the original data $D_3$ is converted to data based on bit units by the original data conversion means 40. The original pattern data $D_4$ obtained as a result of such conversion, is the same type of data as the inspected pattern data $D_2$ shown in FIG. 7. Such data conversion can be realized by determining whether the original data $D_3$ for the pertinent location is of the white level "0", the grey level "0.5" or the black level "1", by considering the pattern data formed by the original data $D_3$ for each bit portion, but such a conversion takes a long time. The grey level "0.5" can be determined, for example, by defining a range between the white and black regions as the grey level "0.5".

The original pattern data $D_4$ output from the original data conversion means 40 is stored in the original pattern memory means 42 under the control of CPU 32. Further, input means 44 is capable of independently inputting specified data to the original pattern memory 42.

During the inspection of pattern portions other than repeated pattern portions of memory cells, etc., among the high density pattern on the mask substrate 10, the apparatus of a first embodiment, sequentially converts each bit of original data $D_3$, sent from the magnetic tape 38, into original pattern data $D_4$ in synchronization with the scanning in the original data conversion circuit 40. The original pattern data $D_4$ is then temporarily stored in the original pattern memory 42. The inspected pattern signal D1 obtained from the scanning unit 100 is converted and is compared and collated, sequentially, with the inspected pattern data $D_2$ stored in the inspected pattern memory 36 by the comparator 300, and any faults are output to the output 52.

Figure 8:
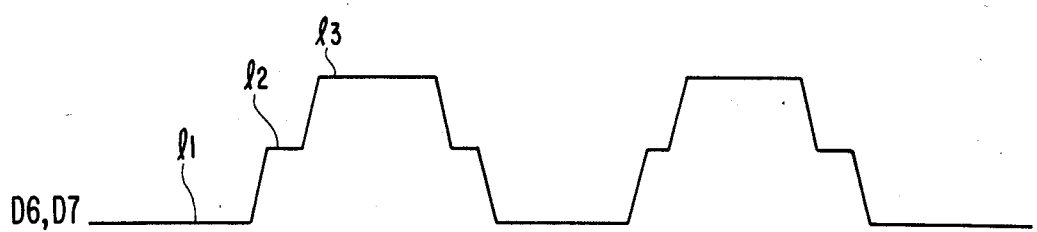
FIG. 8 is an illustration of a comparison signal.

The comparator 300 comprises a converter 46 which converts the inspected pattern data $D_2$ into an inspected comparison signal $D_6$, a converter 50 which converts the original pattern data $D_4$ into the original comparison signal $D_7$, and a comparator 50 which compares the signals $D_6$ and $D_7$. The signals $D_6$ and $D_7$ are the type of signal shown in FIG. 8. Namely, the signal level of the white regions corresponds to the level $l_1$, the signal level of the grey regions corresponds to the level $l_2$, and the signal level of the black regions corresponds to the level $l_3$. The position along the horizontal (x) axis of the signal shown in FIG. 8 has a positional relation equivalent to that of FIG. 6.

During the inspection of basic repeated pattern portions along the high density pattern on the mask substrate 10, such as memory cell regions, the original data $D_3$ obtained from the magnetic tape 38 is not used;

instead, repeated basic pattern data $D_5$, corresponding to the basic pattern, is input to the original pattern memory 42 from the input means 44, and the data $D_5$ is repeatedly compared and collated with the inspected pattern data $D_2$ by the comparator 300. The repeated basic pattern data $D_5$ is the data as shown in FIG. 7, in the case where the pattern indicated by the hatched area in FIG. 5 is considered as the basic pattern. The basic pattern is usually simpler than a random pattern and, therefore, only a short time is required to input data corresponding to such a pattern. Moreover, since it is not necessary to sequentially convert the original data, in synchronization with the scanning of the mask substrate, the scanning speed of the scanning unit 100 can be increased, thereby drastically reducing the inspection time.

Additionally, since it is not always necessary to previously store the original data $D_3$ corresponding to the repeated pattern on the magnetic tape 38, a tape unit is not required if the inspected pattern is a repeated pattern. In the embodiment without a tape unit, the repeated basic pattern data $D_5$ is input to the original pattern memory 42 by the input means 44. The present invention, however, is not limited only to such method and, for example, it is possible that the original data $D_3$ concerning the basic pattern is input to the original data converter 40 by the magnetic tape 38, converted into the repeated basic pattern data $D_5$, input to the original pattern memory 42, and then the data $D_5$ is repeatedly compared and collated. It is also possible that an output is partly modified and it is input to the original pattern memory 42, in case at least one repeated basic pattern output from the A/D converter 34 is correct.

According to the present invention, as explained above, it is not necessary to sequentially convert the original data $D_3$ of all patterns into the original pattern data $D_4$, bit by bit, in synchronization with the scanning of a mask substrate, if repeated pattern portions of the mask substrate are being inspected. Therefore, the inspection time can be decreased by a large extent. Moreover, according to the present invention, it is no longer necessary to previously store all original data of the repeated pattern portion in the storing medium such as magnetic tape 38, etc., and the storing medium is not always required.

We claim:

1. A method for inspecting a pattern by collating and comparing a signal obtained by scanning a mask substrate having a high density pattern including repeated pattern portions and a signal obtained from original data corresponding to the high density pattern and stored in a memory means, comprising the steps of:
    (a) repeatedly collating and comparing inspected pattern data corresponding to the signal obtained by scanning said mask substrate and repeated original pattern data corresponding to a basic pattern of said repeated pattern portions for inspecting said repeated pattern portions, the repeated pattern original data being stored in the memory means and used repeatedly for comparison to the repeated pattern portion; and
    (b) collating and comparing inspected pattern data and original pattern data, obtained by sequentially converting said original data, in synchronization with said scanning of said mask substrate, for inspecting high density pattern portions other than said repeated pattern portions.

2. An apparatus for inspecting a mask substrate having a high density pattern including repeated pattern portions formed on the basis of original data corresponding to the high density pattern, comprising:
    scanning means for scanning the mask substrate to produce an optical signal, photo-electrically converting the optical signal to an electrical inspected pattern signal and outputting the inspected pattern signal;
    A/D conversion means, operatively connected to said scanning means, for converting said inspected pattern signal from an analog to a digital signal and outputting inspected pattern data;
    original data conversion means for sequentially converting the original data corresponding to the high density pattern in synchronization with said scanning of the mask substrate and outputting original pattern data;
    original pattern memory means, operatively connected to said original data conversion means, for temporarily storing said original pattern data;
    input means, operatively connected to said original pattern memory means, for inputting repeated basic bit pattern data, corresponding to a basic pattern of said repeated pattern portions, to said original pattern memory means; and
    collation/comparison means, operatively connected to said A/D conversion means and said original pattern memory means, for receiving said repeated basic bit pattern data from said input means via said original pattern memory means when said scanning means scans repeated pattern portions and repeatedly collating and comparing said repeated basic bit pattern data with said inspected pattern data, and for receiving said original pattern data from said original data conversion means via said original pattern memory means when said scanning means scans pattern portions other than the repeated pattern portions and sequentially collating and comparing said original pattern data with said inspected pattern data.

* * * * *